United States Patent
Kondou et al.

(10) Patent No.: US 12,424,390 B2
(45) Date of Patent: Sep. 23, 2025

(54) ELECTROLYTIC CAPACITOR AND METHOD FOR PRODUCING SAME

(71) Applicant: Panasonic Intellectual Property Management Co., Ltd., Osaka (JP)

(72) Inventors: Shinji Kondou, Kanagawa Ken (JP); Kazuya Yamasaki, Kyoto Fu (JP); Takashi Kawasaki, Osaka Fu (JP); Koji Yokoyama, Miyagi Ken (JP); Hitoshi Ishimoto, Hyogo Ken (JP); Yoshihisa Nagasaki, Osaka Fu (JP); Yuji Miyachi, Saga Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 18/549,498

(22) PCT Filed: Mar. 4, 2022

(86) PCT No.: PCT/JP2022/009293
§ 371 (c)(1),
(2) Date: Sep. 7, 2023

(87) PCT Pub. No.: WO2022/191050
PCT Pub. Date: Sep. 15, 2022

(65) Prior Publication Data
US 2024/0161985 A1  May 16, 2024

(30) Foreign Application Priority Data

Mar. 12, 2021 (JP) .................. 2021-040633

(51) Int. Cl.
*H01G 9/028* (2006.01)
*H01G 9/00* (2006.01)
(Continued)

(52) U.S. Cl.
CPC .......... *H01G 9/028* (2013.01); *H01G 9/0036* (2013.01); *H01G 9/048* (2013.01); *H01G 9/15* (2013.01)

(58) Field of Classification Search
CPC ........ H01G 9/028; H01G 9/0036; H01G 9/15; H01G 9/00
See application file for complete search history.

(56) References Cited

U.S. PATENT DOCUMENTS

| 6,229,689 B1 * | 5/2001 | Kobayashi | H01G 9/025 361/535 |
| 2009/0161299 A1 * | 6/2009 | Nemoto | H01G 2/065 29/25.03 |

(Continued)

FOREIGN PATENT DOCUMENTS

| JP | H10-032145 A | 2/1998 |
| JP | 2002-252148 A | 9/2002 |

(Continued)

OTHER PUBLICATIONS

International Search Report dated May 31, 2022 issued in International Patent Application No. PCT/JP2022/009293, with English translation.

*Primary Examiner* — Dion R. Ferguson
(74) *Attorney, Agent, or Firm* — Rimon P.C.

(57) ABSTRACT

An electrolytic capacitor includes an anode body, a dielectric layer that covers the anode body, a first solid electrolyte layer that covers the dielectric layer, and a second solid electrolyte layer that covers the first solid electrolyte layer. The first solid electrolyte layer contains a first conductive polymer that includes polypyrrole as a basic skeleton. The second solid electrolyte layer contains a second conductive (Continued)

polymer that includes polythiophene as a basic skeleton. The second solid electrolyte layer has a thickness of 1 μm or more.

20 Claims, 2 Drawing Sheets

(51) Int. Cl.
    *H01G 9/048*     (2006.01)
    *H01G 9/15*     (2006.01)

(56) References Cited

U.S. PATENT DOCUMENTS

| | | | |
|---|---|---|---|
| 2010/0271757 A1* | 10/2010 | Ishikawa | H01G 9/028 |
| | | | 427/487 |
| 2014/0063691 A1* | 3/2014 | Kosuge | H01G 9/028 |
| | | | 361/525 |
| 2014/0334069 A1* | 11/2014 | Petrzilek | H01G 9/0036 |
| | | | 427/80 |
| 2017/0241025 A1* | 8/2017 | Smirnova | H01G 11/48 |
| 2019/0148080 A1* | 5/2019 | Fukui | H01G 9/15 |
| | | | 361/525 |
| 2020/0082994 A1* | 3/2020 | Fukui | H01G 9/028 |
| 2020/0168404 A1* | 5/2020 | Fukui | H01G 9/028 |
| 2022/0084756 A1* | 3/2022 | Fukui | H01G 9/028 |
| 2024/0161985 A1* | 5/2024 | Kondou | H01G 9/00 |
| 2024/0177940 A1* | 5/2024 | Kondou | H01G 9/028 |

FOREIGN PATENT DOCUMENTS

| | | | | |
|---|---|---|---|---|
| JP | 2007-184318 A | | 7/2007 | |
| JP | 2008-118060 A | | 5/2008 | |
| JP | 2008-311582 A | | 12/2008 | |
| JP | 2011192688 A | * | 9/2011 | |
| JP | 2011-253878 A | | 12/2012 | |
| JP | 2014-049602 A | | 3/2014 | |
| WO | WO-9967797 A1 | * | 12/1999 | H01G 11/48 |

* cited by examiner

ELECTROLYTIC CAPACITOR AND METHOD FOR PRODUCING SAME

CROSS-REFERENCE OF RELATED APPLICATIONS

This application is the U.S. National Phase under 35 U.S.C. § 371 of International Patent Application No. PCT/JP2022/009293, filed on Mar. 4, 2022, which in turn claims the benefit of Japanese Patent Application No. 2021-040633, filed on Mar. 12, 2021, the entire disclosures of which Applications are incorporated by reference herein.

TECHNICAL FIELD

The present invention relates to an electrolytic capacitor provided with a solid electrolyte layer, and a method for producing the same.

BACKGROUND ART

An electrolytic capacitor includes a capacitor element, an electrode terminal that is electrically connected to the capacitor element, and a sheathing body in which the capacitor element is sealed. The capacitor element includes an anode body, a dielectric layer that covers the anode body, and a solid electrolyte layer that covers the dielectric layer, for example.

The solid electrolyte layer contains a conductive polymer. Polypyrrole is used as a conductive polymer, for example (e.g., PTL 1).

CITATION LIST

Patent Literature

[PTL 1] Japanese Laid-Open Patent Publication No. 2008-118060

SUMMARY OF INVENTION

Technical Problem

Recent years have seen demand for improving the capacitance of electrolytic capacitors and reducing leakage current.

Solution to Problem

A first aspect of the present disclosure relates to an electrolytic capacitor that includes an anode body, a dielectric layer that covers the anode body, a first solid electrolyte layer that covers the dielectric layer, and a second solid electrolyte layer that covers the first solid electrolyte layer, in which the first solid electrolyte layer contains a first conductive polymer that includes polypyrrole as a basic skeleton, the second solid electrolyte layer contains a second conductive polymer that includes polythiophene as a basic skeleton, and the second solid electrolyte layer has a thickness of 1 µm or more.

Another aspect of the present invention relates to a method for producing an electrolytic capacitor, the method including a first step of preparing an anode body provided with a dielectric layer, a second step of forming a first solid electrolyte layer containing a first conductive polymer that includes polypyrrole as a basic skeleton by electrolytically polymerizing, on the dielectric layer, a precursor of the first conductive polymer, and a third step of forming a second solid electrolyte layer containing a second conductive polymer that includes polythiophene as a basic skeleton by applying, to the first solid electrolyte layer, a processing liquid containing the second conductive polymer, in which the second solid electrolyte layer has a thickness of 1 µm or more.

Advantageous Effects of Invention

According to the present invention, it is possible to improve the capacitance and reduce leakage current of an electrolytic capacitor.

While novel features of the present invention are set forth particularly in the appended claims, the present invention, both as to organization and content, will be better understood and appreciated, along with other objects and features thereof, from the following detailed description taken in conjunction with the drawings.

DESCRIPTION OF EMBODIMENTS

Although an embodiment of the present disclosure will be described below using an example, the present disclosure is not limited to an example described below. Although specific numerical values, materials, and the like may be mentioned as examples in the following description, other numerical values, materials, and the like may be used as long as effects of the present disclosure can be obtained. Note that a constituent element of a known electrolytic capacitor may be applied to a constituent element other than characteristic portions of the present disclosure. The term "range from numerical value A to numerical value B" used in this specification includes the numerical value A and the numerical value B. If a plurality of materials are mentioned as examples, one of the plurality of materials may be selected and used alone, or these materials may be used in a combination of two or more.

The electrolytic capacitor according to one embodiment of the present invention includes an anode body, a dielectric layer that covers the anode body, a first solid electrolyte layer that covers a dielectric layer, and a second solid electrolyte layer that covers the first solid electrolyte layer. The first solid electrolyte layer (also referred to as a "first layer" hereinafter) contains a first conductive polymer that includes polypyrrole as a basic skeleton (also referred to as a "polypyrrole-based polymer" hereinafter). The second solid electrolyte layer (also referred to as a "second layer" hereinafter) contains a second conductive polymer that includes polythiophene as a basic skeleton (also referred to as a "polythiophene-based polymer" hereinafter). The second solid electrolyte layer has a thickness of 1 µm or more. The first layer enters micropores of the anode body by an amount of 90% by mass or more. The second layer is present outside the micropores of the anode body by an amount of 90% by mass or more. The second layer may have the form of an outermost layer formed along an external shape from which the micropores of the anode body are ignored.

When the above configuration is satisfied, it is possible to achieve both capacitance improvement and leakage current reduction.

The first layer contains a polypyrrole-based polymer, and thus is likely to reduce leakage current, but is less likely to improve capacitance. To address this, capacitance can be improved by disposing the second layer having high electrical conductivity on the first layer.

Further, the second layer contains a polythiophene-based polymer, and thus is likely to increase electrical conductivity, but is likely to increase leakage current. To address this, an increase in leakage current can be significantly suppressed by increasing the thickness of the second layer to 1 μm or more.

Because it is advantageous for the anode body to have a large surface area in order to form a dielectric layer and a solid electrolyte layer, in general, at least a surface (surface layer) of the anode body has a porous portion. The porous portion contains many pores (pits). The dielectric layer covers an outer surface of the porous portion and inner wall surfaces of the pores. It is sufficient that the first layer covers at least inner wall surfaces of the pores of the porous portion via the dielectric layer. The first layer may cover the outer surface of the porous portion via the dielectric layer, and in such a case, the first layer that covers the outer surface of the porous portion may be thinner than the first layer that covers the inner wall surfaces of the pores of the porous portion. The second layer covers the outer surface of the porous portion via the dielectric layer (or the dielectric layer and the first layer). The second layer may further cover the inner wall surfaces of the pores of the porous portion via the dielectric layer and the first layer.

When a later-described second processing liquid contains many polythiophene-based polymer particles, and/or when polythiophene-based polymer particles contained in the later-described second processing liquid are large, the thickness of the second layer can be easily increased to 1 μm or more. In this case, the second layer is unlikely to be formed in the pores of the porous portion. The second layer may be formed on the outer surface of the porous portion to cover openings of the pores of the porous portion. In this case, the second layer may be formed to an extent that the second layer slightly enters the pores of the porous portion from the opening portion side of the pores. The second layer may be partially in direct contact with the first layer (in the vicinity of opening portions of the pores of the porous portion). Voids may be formed between the first layer that covers the inner wall surfaces of the pores of the porous portion and the second layer that covers the outer surface (openings of the pores) of the porous portion.

When the thickness (a thickness T2 of a second layer 9b in FIG. 2) of the second layer is 1 μm or more, leakage current can be reduced. From the viewpoint of reducing leakage current, the thickness of the second layer is preferably 5 μm or more. The thickness of the second layer may be 1 μm or more and 20 μm or less, and 5 μm or more and 20 μm or less. When the thickness of the second layer is 20 μm or less, ESR is likely to decrease.

Note that the thickness of the second layer refers to the thickness of the second layer (the thickness T2 in FIG. 2) that covers the outer surface of the porous portion of the anode body via the dielectric layer and the first layer. The thickness of the second layer can be obtained using the following method. First, a capacitor element is taken out from an electrolytic capacitor by disassembling the electrolytic capacitor, and an image of a cross-section of the capacitor element is obtained using a scanning electron microscope (SEM). Using the image, the thickness of the second layer that covers the outer surface of the porous portion (an outer side of a line defining the external shape of the anode body) via the dielectric layer (or the dielectric layer and the first layer) is measured at any ten points of the second layer. The average of the measured thickness values is calculated. Note that the first layer and the second layer can be checked using SEM-EDX (energy dispersive X-ray spectroscopy) analysis.

The thickness of the first layer (the thickness T1 of the first layer 9a in FIG. 2) may be 50 nm or more, and 50 nm or more and 100 nm or less. When the thickness of the first layer is 50 nm or more, leakage current is likely to decrease. When the thickness of the first layer is 100 nm or less, the inner wall surfaces of the pores of the porous portion can be easily covered by the first layer via the dielectric layer. Note that the thickness of the first layer refers to the thickness of the first layer (the thickness T1 in FIG. 2) that covers the inner wall surfaces of the porous portion via the dielectric layer. The thickness of the first layer can be obtained using a method similar to that for the thickness of the second layer. Specifically, the thickness of the second layer that covers the inner wall surfaces of the pores of the porous portion via the dielectric layer is measured at any ten points on a cross-sectional image obtained through SEM, and the average thereof is calculated.

The electrical conductivity of the first layer is preferably lower than that of the second layer. The second layer having higher electrical conductivity is advantageous in improving capacitance, but leakage current is likely to increase. When the electrical conductivity of the first layer is lower than that of the second layer and the surface of the dielectric layer is covered by the second layer via the first layer that is advantageous in reducing leakage current, both leakage current reduction and capacitance improvement can be achieved.

From the viewpoint of reducing leakage current, the electrical conductivity of the first layer is preferably 200 S/cm or less, and more preferably 60 S/cm or more and 150 S/cm or less.

The electrical conductivity of the first layer can be obtained using the following method.

A capacitor element is taken out from the electrolytic capacitor by disassembling the electrolytic capacitor, and components (polypyrrole-based polymers and a first dopant) of the first layer are analyzed. If the first layer is formed using a first processing liquid used in a later-described second step, the first processing liquid may be analyzed. TEM-EELS (electron energy loss spectroscopy), NMR (nuclear magnetic resonance) spectroscopy, Raman spectroscopy, and the like can be used as an analysis method. A sample film (e.g., with a thickness of 20 to 40 μm) containing the same components as the first layer is formed based on analysis results, and the electrical conductivity of the sample film is obtained as the electrical conductivity of the first layer.

The first layer is usually formed by electrolytically polymerizing a precursor of a polypyrrole-based polymer in the presence of the first dopant. Therefore, the sample film containing the same components as the first layer can be formed by preparing a sample solution containing the precursor of the polypyrrole-based polymer and the first dopant, immersing a metal substrate in the sample solution, causing a current to flow through the metal substrate, and electrolytically polymerizing the precursor. The sample film may be formed using the first processing liquid. Loresta GX and PSP probe manufactured by Nittoseiko Analytech Co., Ltd. can be used to measure the electrical conductivity of the sample film.

From the viewpoint of improving capacitance, the electrical conductivity of the second layer is preferably 350 S/cm or more, and more preferably 350 S/cm or more and 800 S/cm or less. The electrical conductivity of the second layer can be obtained using a method similar to that for the electrical conductivity of the first layer. A sample film (e.g., with a thickness of 20 to 40 μm) containing the same components as the second layer is formed based on the analysis results, and the electrical conductivity of the sample film is obtained as the electrical conductivity of the second layer. The sample film containing the same components (polythiophene-based polymers and a second dopant) as the second layer can be formed by preparing a sample solution containing the polythiophene-based polymers and a second dopant, applying the sample solution to a substrate, and drying the substrate. If the second layer is formed using a second processing liquid used in a later-described third step, the second processing liquid may be analyzed, and a sample film may be formed using the second processing liquid.

Hereinafter, an electrolytic capacitor and a method for producing the electrolytic capacitor will be described in further detail.

[Electrolytic Capacitor]
(Anode Body)

The anode body can include a valve metal, an alloy containing a valve metal, a compound containing a valve metal, and the like. These materials may be used alone or in combination of two or more. Aluminum, tantalum, niobium, and titanium are preferably used as a valve metal, for example. A surface layer of the anode body may include a porous portion. Such an anode body can be obtained by, for example, roughening the surface of a substrate (e.g., a foil-shaped substrate or a plate-shaped substrate) that includes a valve metal, through etching. The anode body may also be constituted by a molded article or sintered article of particles that include a valve metal. Because the sintered article has a porous structure, the entire anode body may be a porous portion.

(Dielectric Layer)

The dielectric layer is formed through anodic oxidation caused by performing chemical conversion treatment or the like on the valve metal on the surface of the anode body. It is sufficient that the dielectric layer is formed so as to cover at least a portion of the anode body. In general, the dielectric layer is formed on the surface of the anode body. The dielectric layer is formed on the surface of the porous surface of the anode body and thus extends along the inner wall surfaces of the pores and pits on the surface of the anode body.

The dielectric layer includes a valve metal oxide. For example, a dielectric layer formed using tantalum as the valve metal includes $Ta_2O_5$, and a dielectric layer formed using aluminum as the valve metal includes $Al_2O_3$. Note that there is no limitation to such a dielectric layer as long as the dielectric layer functions as a dielectric.

(Solid Electrolyte Layer)

The solid electrolyte layer is formed so as to cover the dielectric layer. The solid electrolyte layer need not necessarily cover the entire dielectric layer (entire surface thereof), and need only be formed so as to cover at least a portion of the dielectric layer. The solid electrolyte layer includes the first layer containing a polypyrrole-based polymer, and the second layer containing a polythiophene-based polymer formed on the first layer. If a region where the first layer is not formed is present on the dielectric layer, the second layer may be formed on the dielectric layer in this region.

(First Layer)

The first layer contains a polypyrrole-based polymer. The polypyrrole-based polymer includes polypyrrole and derivatives thereof. The weight average molecular weight of the polypyrrole-based polymer is 100 or more and 100,000 or less, for example. Note that the "weight average molecular weight" in this specification refers to a weight average molecular weight measured using gel permeation chromatography (GPC) based on polystyrene.

The first layer usually contains a non-self-doped polypyrrole-based polymer. In this case, the first layer contains a polypyrrole-based polymer (non-self-doped), and a first dopant. In this case, the electrical conductivity of the first layer can be adjusted according to the first dopant.

Note that examples of the non-self-doped polypyrrole-based polymer include a conductive polymer that does not have an anionic group (specifically, a sulfonic acid group, a carboxy group, a phosphoric acid group, a phosphonic acid group, and a salt thereof) that is directly or indirectly covalently bonded to a polypyrrole skeleton of the conductive polymer.

The first dopant may be a small-molecular dopant. The small-molecular dopant is a dopant capable of forming an anion, for example Specific examples of the small-molecular dopant include sulfuric acid, nitric acid, phosphoric acid, boric acid, and organic sulfonic acids. Examples of sulfonic acids include aromatic sulfonic acids. Examples of aromatic sulfonic acids include benzenesulfonic acid, alkylbenzenesulfonic acids (e.g., p-toluenesulfonic acid), naphthalenesulfonic acids, and alkylnaphthalenesulfonic acids.

The first dopant may form a polypyrrole-based polymer complex with a polypyrrole-based polymer in the first layer. The first layer may contain the first dopant in the form of an anion or salt.

The content of the first dopant in the first layer is, for example, 10 parts by mass or more and 70 parts by mass or less with respect to 100 parts by mass of the polypyrrole-based polymer.

The first layer may contain a conductive polymer other than the polypyrrole-based polymer, but the content of the polypyrrole-based polymer is preferably high. The percentage of the polypyrrole-based polymer in all of the conductive polymers contained in the first layer is 90% by mass or more and may be 100% by mass, for example.

The first layer may be a single layer or may be constituted of a plurality of layers. When the first layer is constituted of a plurality of layers, polypyrrole-based polymers contained in the layers may be the same as or different from each other. The first layer may further contain other components within a range in which effects of the present invention are not impaired.

(Second Layer)

The second layer contains a polythiophene-based polymer. The polythiophene-based polymer includes polythiophene and derivatives thereof. Examples of the polythiophene-based polymer include poly(3,4-ethylenedioxythiophene) (PEDOT). In this case, the second layer has high conductivity, and thus high capacitance can be easily obtained. The weight average molecular weight of the polythiophene-based polymer is 100 or more and 100,000 or less, for example.

The second layer may contain a non-self-doped polythiophene-based polymer. In this case, the second layer contains a polythiophene-based polymer (non-self-doped), and a second dopant. In this case, the electrical conductivity of the second layer can be adjusted according to the second dopant. When the polythiophene-based polymer is non-self-doped, polythiophene-based polymer particles can be easily dispersed in the second processing liquid used in a later-described third step (formation of the second layer), and a thick second layer can be easily formed.

Note that examples of the non-self-doped polythiophene-based polymer include a conductive polymer that does not have an anionic group (specifically, a sulfonic acid group, a carboxy group, a phosphoric acid group, a phosphonic acid group, and a salt thereof) that is directly or indirectly covalently bonded to a polythiophene skeleton of the conductive polymer.

The second dopant may be a macromolecular dopant. The macromolecular dopant is a dopant capable of forming a polyanion, for example. Specific examples of a macromolecular dopant include polyvinylsulfonic acid, polystyrenesulfonic acid (PSS), polyallylsulfonic acid, polyacrylsulfonic acid, and polymethacrylsulfonic acid.

The second dopant may form a polythiophene-based polymer complex with a polythiophene-based polymer in the second layer. The second layer may contain the second dopant in the form of a polyanion or salt.

The content of the second dopant in the second layer is, for example, 0.1 parts by mass or more and 50 parts by mass or less with respect to 100 parts by mass of the polythiophene-based polymer.

The second layer may contain a conductive polymer other than the polythiophene-based polymer, but the content of the polythiophene-based polymers is preferably high. The percentage of the polythiophene-based polymers in all of the conductive polymers contained in the second layer is 90% by mass or more and may be 100% by mass, for example.

The second layer may be a single layer or may be constituted of a plurality of layers. When the second layer is constituted of a plurality of layers, polythiophene-based polymers contained in the layers may be the same as or different from each other. The second layer may further contain other components within a range in which effects of the present invention are not impaired.

Figure 1:
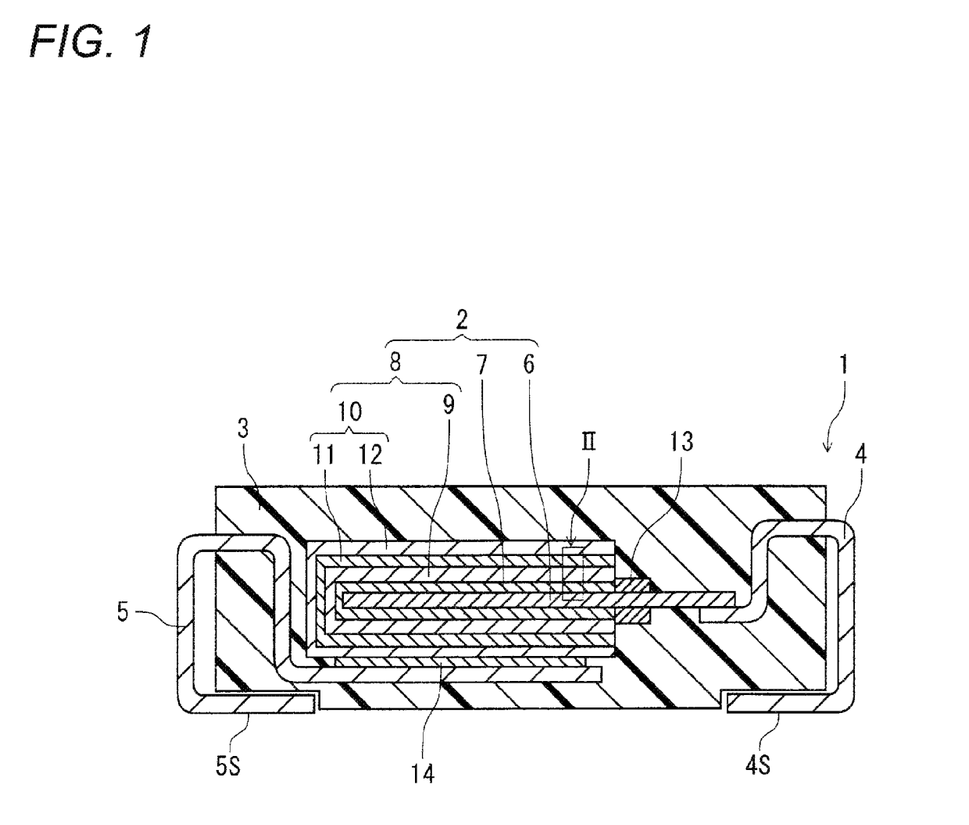
FIG. 1 A schematic cross-sectional view of an electrolytic capacitor according to one embodiment of the present invention.
Figure 2:
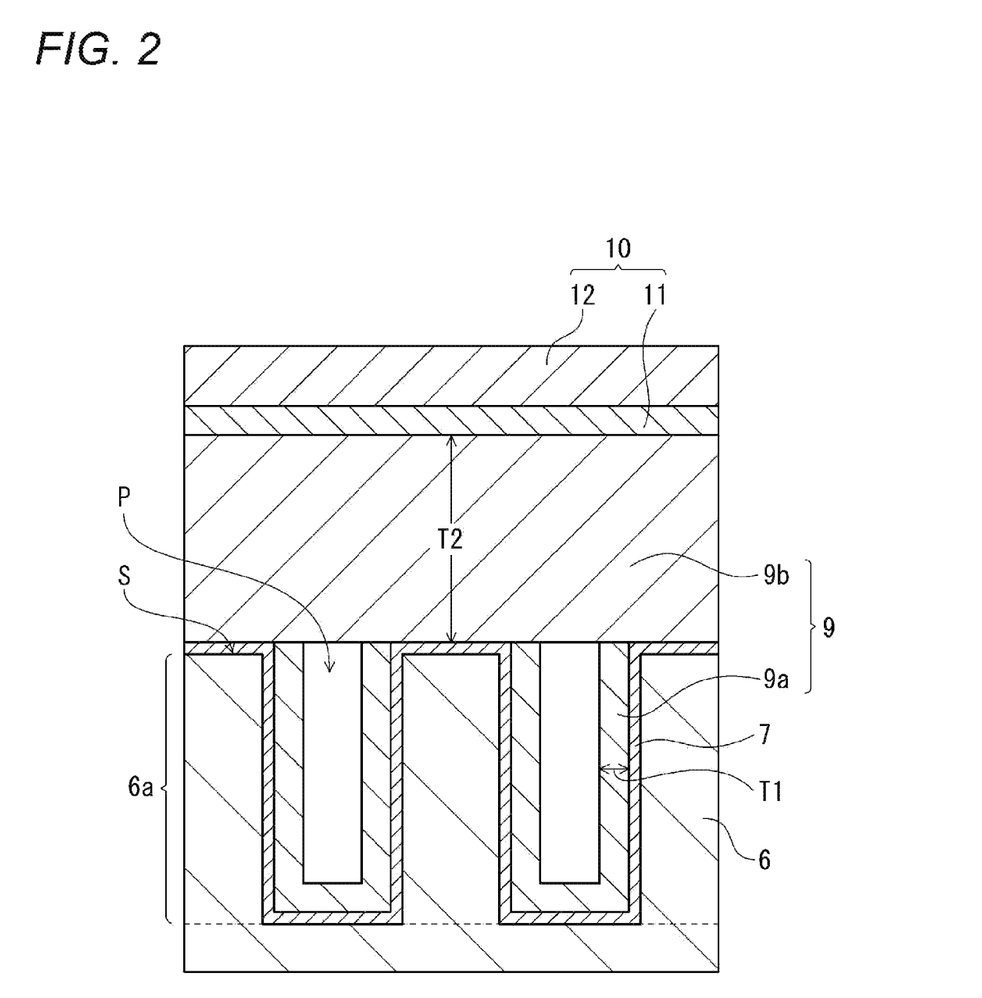
FIG. 2 An enlarged schematic cross-sectional view showing a region II in FIG. 1.

FIG. 1 is a schematic cross-sectional view of an electrolytic capacitor according to one embodiment of the present invention. FIG. 2 is an enlarged schematic cross-sectional view showing a region II in FIG. 1. The electrolytic capacitor 1 includes a capacitor element 2, a resin sealing member (sheathing body) 3 in which the capacitor element 2 is sealed, and an anode terminal 4 and a cathode terminal 5 at least portions of which are exposed to the outside of the resin sealing member 3. The anode terminal 4 and the cathode terminal 5 can be made of a metal (copper or a copper alloy), for example. The external shape of the resin sealing member 3 is a substantially rectangular parallelepiped, and the external shape of the electrolytic capacitor 1 is also a substantially rectangular parallelepiped. An epoxy resin can be used as a material of the resin sealing member 3, for example.

The capacitor element 2 includes an anode body 6, a dielectric layer 7 that covers the anode body 6, and a cathode portion 8 that covers the dielectric layer 7. The cathode portion 8 includes a solid electrolyte layer 9 that covers the dielectric layer 7, and a cathode lead-out layer 10 that covers the solid electrolyte layer 9. The cathode lead-out layer 10 includes a carbon layer 11 and a silver paste layer 12.

The anode body 6 has a porous portion 6a, and includes a region facing the cathode portion 8, and a region that does not face the cathode portion 8. The porous portion 6a includes a large number of pores P. The pores P may be sponge-like pits or tunnel-like pits. In the region of the anode body 6 that does not face the cathode portion 8, an insulating separation layer 13 is formed on a portion adjacent to the cathode portion 8 and covers the surface of the anode body 6 in a band-like manner, thereby restricting contact between the cathode portion 8 and the anode body 6. Another portion in the region of the anode body 6 that does not face the cathode portion 8 is electrically connected to the anode terminal 4 through welding. The cathode terminal 5 is electrically connected to the cathode portion 8 via an adhesive layer 14 formed using a conductive adhesive.

A main surface 4S of the anode terminal 4 and a main surface 5S of the cathode terminal 5 are exposed from the same surface of the resin sealing member 3. These exposed surfaces are used to, for example, solder the terminals to a substrate (not illustrated) on which the electrolytic capacitor 1 is to be installed.

The carbon layer 11 need only be conductive, and can be constituted using a conductive carbon material (graphite or the like), for example. A composition containing silver powder and a binder resin (an epoxy resin or the like) can be used for the silver paste layer 12, for example Note that a configuration of the cathode lead-out layer 10 is not limited to this, and need only have a current collecting function.

The solid electrolyte layer 9 is formed so as to cover the dielectric layer 7. The dielectric layer 7 is formed along a surface (inner wall surfaces of the pores P and the outer surface S of the porous portion 6a) of the anode body 6. The surface of the dielectric layer 7 has an uneven shape conforming to the shape of the surface of the anode body 6. The solid electrolyte layer 9 is preferably formed to level out the unevenness of the dielectric layer 7.

The solid electrolyte layer 9 includes the first layer 9a and the second layer 9b. The first layer 9a is formed so as to cover the inner wall surfaces of the pores P of the porous portion 6a via the dielectric layer 7. As shown in FIG. 2, the first layer 9a does not need to cover the outer surface S of the porous portion 6a. The second layer 9b is formed so as to cover the outer surface S of the porous portion 6a via the dielectric layer 7. As shown in FIG. 2, the second layer 9b does not need to enter the pores P of the porous portion 6a, and may be formed to cover the openings of the pores P of the porous portion 6a. In this case, voids may be present in the pores P between the first layer 9a and the second layer 9b. The first layer 9a contains polypyrrole-based polymers, and the second layer 9b contains polythiophene-based polymers. The first layer 9a has the thickness T1, and the second layer 9b has the thickness T2. The thickness T2 of the second layer 9b is 1 μm or more.

Further, the first layer may be formed so as to cover the outer surface S of the porous portion 6a via the dielectric layer 7. In this case, the second layer is formed so as to cover the outer surface S of the porous portion 6a via the dielectric layer and the first layer.

The electrolytic capacitor according to this embodiment is not limited to the electrolytic capacitor having the above structure, and can be applied to electrolytic capacitors having various structures. Specifically, the present invention can be applied to an electrolytic capacitor in which a sintered article made of metal powder is used as an anode body, a wound electrolytic capacitor, and the like.

[Method for Producing Electrolytic Capacitor]

A method for producing an electrolytic capacitor according to one embodiment of the present invention includes a first step of preparing an anode body on which a dielectric layer is formed, a second step of forming a first layer on the dielectric layer, and a third step of forming a second layer on the first layer. The first layer contains a polypyrrole-based polymer, and the second layer contains a polythiophene-based polymer. Also, the second layer has a thickness of 1 µm or more. A solid electrolyte layer provided with the first layer and the second layer is formed through the second step and the third step. Further, the method for producing an electrolytic capacitor may include a step of preparing an anode body before performing the first step. The production method may include a step of forming a cathode lead-out layer, and/or a step of sealing a capacitor element.

Hereinafter, each step will be described in detail.
(Step of Preparing Anode Body)

In this step, an anode body is formed using a known method depending on the type of anode body.

The anode body can be prepared by roughening the surface of a plate-shaped substrate or a foil-shaped substrate that includes a valve metal, for example. A porous portion is formed on the surface layer of the anode body through roughening. Roughening may be performed by, for example, etching a substrate surface (e.g., electrolytic etching), as long as unevenness can be formed on the substrate surface through roughening.

Also, powder of a valve metal (e.g., tantalum) is prepared, and a molded article, which is formed into a desired shape (e.g., a block shape) with one end side of a md-shaped anode lead in a longitudinal direction of the anode lead embedded in the powder, is obtained. An anode body having a porous structure with one end of the anode lead embedded may be formed by sintering the molded article.
(First Step)

In the first step, a dielectric layer is formed on the anode body. The dielectric layer is formed through anodic oxidation of the anode body. Anodic oxidation can be performed using a known method such as chemical conversion treatment, for example. Chemical conversion treatment can be performed by impregnating the surface of the anode body with a chemical conversion liquid by immersing the anode body in the chemical conversion liquid, and applying a voltage between the anode body serving as an anode and a cathode immersed in the chemical conversion liquid, for example. It is preferable to use an aqueous solution of phosphoric acid as a chemical conversion liquid, for example.
(Second Step)

It is preferable to form the first layer containing a polypyrrole-based polymer by electrolytically polymerizing a precursor of the polypyrrole-based polymer on the dielectric layer in the second step. In the case of electrolytic polymerization, a conductive precoat layer may be formed before electrolytic polymerization is performed. In this case, the first layer may be formed directly on the dielectric layer, or may be formed via a precoat layer.

In the case of electrolytic polymerization, the first layer is formed using a first processing liquid containing a precursor of a polypyrrole-based polymer, a first dopant, and a dispersion medium (or a solvent), for example. The first layer may be formed by immersing the anode body provided with the dielectric layer and the precoat layer in the first processing liquid, and supplying power from a supply electrode using the precoat layer as an electrode, for example. The precoat layer is made of a conductive material (conductive polymers, an inorganic conductive material, or the like), for example. There is no particular limitation on a conductive material for constituting the precoat layer, and a known conductive material can be used, for example.

Also, in the second process, the first layer may be formed by chemically polymerizing a precursor of a polypyrrole-based polymer. In the case of chemical polymerization, the first layer is formed using a processing liquid containing a precursor of a polypyrrole-based polymer, a first dopant, an oxidant, and a dispersion medium (or a solvent), for example. A processing liquid may be adhered to the dielectric layer and then heated.

Also, in the second process, the first layer may be formed by adhering a processing liquid containing a polypyrrole-based polymer, a first dopant, and a dispersion medium (or a solvent) to the dielectric layer.

It is possible to use the polypyrrole-based polymers and first dopant mentioned above. Examples of a precursor of a polypyrrole-based polymer include a monomer to constitute a polypyrrole-based polymer, and/or an oligomer in which monomers are linked. Examples of a dispersion medium (or a solvent) include water, organic solvents, and mixtures thereof. Examples of organic solvents include monohydric alcohols (methanol, ethanol, propanol, or the like), polyhydric alcohols (ethylene glycol, glycerin, or the like), and polar aprotic solvents (N,N-dimethylformamide, dimethyl sulfoxide, acetonitrile, acetone, benzonitrile, or the like). The processing liquid (first processing liquid) may further contain other components.
(Third Step)

In the third process, a second layer containing a polythiophene-based polymer is formed by adhering a second processing liquid containing the polythiophene-based polymer to the first layer, for example. The second layer may be formed by immersing, in the second processing liquid, the anode body in which the first layer is formed on the dielectric layer, and drying the anode body. The second layer may be formed by applying or dropping the second processing liquid onto the anode body in which the first layer is formed on the dielectric layer, and drying the anode body.

The second processing liquid contains a polythiophene-based polymer and a dispersion medium (or a solvent), and a second dopant as needed. It is possible to use the polythiophene-based polymers and second dopant mentioned above. The dispersion medium (or the solvent) mentioned in the second step can be used as a dispersion medium (or a solvent). The second processing liquid may further contain other components.

A dispersion liquid (or a solution) of a polythiophene-based polymer, or a dispersion liquid (or a solution) of a polythiophene-based polymer complex of a polythiophene-based polymer and a second dopant may be used as the second processing liquid, for example. The second processing liquid can be obtained through oxidative polymerization of a precursor of a polythiophene-based polymer in a dispersion medium (or a solvent), for example Examples of the precursor include a monomer to constitute a polythiophene-based polymer, and/or an oligomer in which monomers are linked. The second processing liquid containing a polythiophene-based polymer complex can be obtained through oxidative polymerization of a precursor of a polythiophene-based polymer in the presence of the second dopant in a dispersion medium (or a solvent). Examples of a polythiophene-based polymer complex include PEDOT doped with PSS (PEDOT/PSS).

From the viewpoint of forming a thick second layer, the second processing liquid may be a dispersion liquid of a polythiophene-based polymer (or polythiophene-based polymer complex). Non-self-doped polythiophene-based polymers are less soluble in water than self-doped polythiophene-based polymers, are capable of dispersing a larger number of polythiophene-based polymer (or polythiophene-based polymer complex) particles in the second processing liquid that contains water, and are likely to form a thick second layer.

From the viewpoint of facilitating formation of a thick second layer, the average particle size of the polythiophene-based polymer (or polythiophene-based polymer complex) particles dispersed in the second processing liquid may be 20 nm or more, 100 nm or more, and 150 nm or more. The upper limit of the average particle size is not particularly limited, but is 1000 nm or less, for example. Note that an "average particle size" used in this specification refers to a median diameter (D50) in volume based particle size distribution.

The average particle size of a polythiophene-based polymer (or polythiophene-based polymer complex) can be obtained from a particle size distribution obtained through dynamic light scattering (DLS). Specifically, particles are dispersed in water (in the second processing liquid containing water) using ultrasonic waves, and the particle size distribution of the particles is measured using a dynamic light scattering particle size analyzer (LB-550 manufactured by HORIBA, Ltd.) based on volume, and the obtained median diameter (D50) is used as the average particle size.
(Step of Forming Cathode Lead-Out Layer)

In this step, a cathode lead-out layer is formed by successively laminating a carbon layer and a silver paste layer on the second layer formed in the third step. A capacitor element can be obtained by forming a cathode lead-out layer.

Note that a conductive adhesive layer is disposed on a surface of the cathode lead-out layer, and one end portion of the cathode terminal is electrically connected to the capacitor element via the adhesive layer. An electrode terminal used in an electrolytic capacitor can be used as a cathode terminal without particular limitation, and a so-called lead frame may be used, for example
(Step of Sealing Capacitor Element Using Resin Sealing Member)

The formed capacitor element is sealed using a resin material together with portions of the anode terminal and the cathode terminal, for example. A resin sealing member is formed through this sealing. A thermosetting resin (epoxy resin or the like) or a resin composition is preferable as a resin material. Note that the resin sealing member contains a thermosetting resin or a cured product of a resin composition.

EXAMPLES

Hereinafter, the present invention will be specifically described based on examples and comparative examples. However, the present invention is not limited to the following examples.

Example 1

(Step of Forming Dielectric Layer on Surface of Anode Body)

A tantalum sintered article (porous body) in which a portion of an anode lead was embedded was prepared as an anode body. The tantalum sintered article was a rectangular parallelepiped, and the anode lead was extended from one end surface of the rectangular parallelepiped. The anode body was subjected to anodic oxidation in an aqueous solution of phosphoric acid, and a dielectric layer containing tantalum oxide ($Ta_2O_5$) was formed on the surface of the anode body.
(Step of Forming First Layer)

An aqueous dispersion liquid (first processing liquid) containing pyrrole and a first dopant (a sulfonic acid salt having a naphthalene skeleton) was prepared. Note that the concentration of pyrrole in the first processing liquid can be selected as appropriate in a range of 1% by mass to 6% by mass, for example, and the concentration of the first dopant in the first processing liquid can be selected as appropriate in a range of 3% by mass to 12% by mass, for example.

The anode body provided with the dielectric layer was immersed in a processing liquid containing a conductive material to form a precoat layer. The first layer (electrical conductivity: 80 S/cm) containing polypyrrole and the first dopant was formed by immersing the anode body provided with the dielectric layer and the precoat layer in the first processing liquid, and causing electrolytic polymerization of pyrrole to proceed using the precoat layer as an electrode.
(Step of Forming Second Layer)

An aqueous dispersion liquid (second processing liquid) containing a polymer complex (PEDOT/PSS) of PEDOT (polythiophene-based polymer) and a second dopant (PSS) was prepared. The concentration of PEDOT/PSS in the second processing liquid can be selected as appropriate in a range of 1% by mass to 2% by mass, for example. The average particle size of PEDOT/PSS was 200 nm.

The second layer (electrical conductivity: 400 S/cm) was formed by immersing, in the second processing liquid, the anode body on which the first layer was formed, and performing a step of drying at 150° C. for 10 to 30 minutes once. The solid electrolyte layer constituted of the first layer and the second layer was formed in this manner. The thickness T1 of the first layer was 100 nm. The thickness T2 of the second layer was 1 µm.
(Step of Forming Cathode Lead-Out Layer)

A carbon layer was formed by applying, to a surface of the solid electrolyte layer, a dispersion liquid in which graphite particles were dispersed in water, and drying the layer. Then, a silver paste layer was formed by applying a silver paste containing silver particles and a binder resin (epoxy resin) to the surface of the carbon layer, and curing the binder resin through heating. The cathode lead-out layer constituted of the carbon layer and the silver paste layer was formed in this manner. A capacitor element was obtained in this manner.
(Step of Sealing Capacitor Element)

The anode terminal (anode lead frame) was welded to the anode lead, the cathode terminal (cathode lead frame) was connected to the cathode lead-out layer using a conductive adhesive, and the capacitor element was sealed using the resin sealing member. An electrolytic capacitor A1 of Example 1 was produced in this manner.

Example 2

An electrolytic capacitor A2 of Example 2 was produced in the same manner as in Example 1, except that a step of immersing the anode body provided with the first layer in the second processing liquid was repeated twice in the step of forming the second layer, and thus the thickness T2 of the second layer was 5 µm.

Example 3

An electrolytic capacitor A3 of Example 3 was produced in the same manner as in Example 1, except that a step of immersing the anode body provided with the first layer in the second processing liquid was repeated four times in the step of forming the second layer, and thus the thickness T2 of the second layer was 20 µm.

Example 4

An electrolytic capacitor A4 of Example 4 was produced in the same manner as in Example 1, except that a step of immersing the anode body provided with the first layer in the second processing liquid was repeated six times in the step of forming the second layer and thus the thickness T2 of the second layer was 30 μm.

Comparative Example 1

An electrolytic capacitor B1 of Comparative Example 1 was produced in the same manner as in Example 1, except that a layer (electrical conductivity: 80 S/cm) containing the same components (polypyrrole and the first dopant) as the first layer was formed as the second layer.

Comparative Example 2

An electrolytic capacitor B2 of Comparative Example 2 was produced in the same manner as in Example 1, except that the content of water in the second processing liquid was increased (the viscosity of the second processing liquid was reduced) in the step of forming the second layer, and thus the thickness T2 of the second layer was 0.6 μm.

[Evaluation]

The electrolytic capacitors of the examples and the comparative examples produced above were evaluated as follows.

An LCR meter for four-terminal measurement was used to measure an initial capacitance (μF) of each electrolytic capacitor at a frequency of 120 Hz and in an environment at 20° C. Also, a current flowing after 40 seconds under a predetermined voltage in an environment at 25° C. was measured as leakage current. The leakage current was measured at a voltage (e.g., 2.5 V, 16 V, 35 V, or the like) depending on the device model.

Evaluation results are shown in Table 1. Note that, in Table 1, capacitance and leakage current are respectively shown as relative values when the capacitance and the leakage current of the electrolytic capacitor B1 of Comparative Example 1 are set to 100.

TABLE 1

| Electrolytic Capacitor | Second Conductive Polymer in Second Layer | Thickness T2 of Second Layer (μm) | Capacitance (relative value) | Leakage Current (relative value) |
| --- | --- | --- | --- | --- |
| B1 | Polypyrrole-based polymer | 20 | 100 | 100 |
| B2 | Polythiophene-based polymer | 0.6 | 105 | 120 |
| A1 | Polythiophene-based polymer | 1 | 108 | 95 |
| A2 | Polythiophene-based polymer | 5 | 110 | 90 |
| A3 | Polythiophene-based polymer | 20 | 110 | 90 |
| A4 | Polythiophene-based polymer | 30 | 110 | 90 |

The electrolytic capacitors A1 to A4 had higher capacitance and smaller leakage current than the electrolytic capacitors B1 to B2.

Further, an LCR meter for four-terminal measurement was used to measure an initial ESR (mΩ) of the electrolytic capacitors A1 to A4 at a frequency of 100 kHz in an environment at 20° C. As a result, all of the electrolytic capacitors A1 to A4 had favorable ESR. In particular, the electrolytic capacitors A1 to A3 whose second layer had a thickness T2 of 1 to 20 μm exhibited lower ESR.

INDUSTRIAL APPLICABILITY

An electrolytic capacitor according to the present invention is suitably used for applications that require high capacitance and small leakage current for the electrolytic capacitor.

Although the present invention has been described in terms of the presently preferred embodiments, it is to be understood that such a disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST 1 solid electrolytic capacitor
2 capacitor element
3 resin sealing member
4 anode terminal
    4S main surface of anode terminal
5 cathode terminal
    5S main surface of cathode terminal
6 anode body
7 dielectric layer
8 cathode portion
9 solid electrolyte layer
    9a first layer
    9b second layer
10 cathode lead-out layer
11 carbon layer
12 silver paste layer
13 separation layer
14 adhesive layer

The invention claimed is:

1. An electrolytic capacitor comprising:
an anode body;
a dielectric layer that covers the anode body;
a first solid electrolyte layer that covers the dielectric layer; and
a second solid electrolyte layer that covers the first solid electrolyte layer,
wherein the first solid electrolyte layer contains a first conductive polymer that includes polypyrrole as a basic skeleton,
the second solid electrolyte layer contains a second conductive polymer that includes polythiophene as a basic skeleton,
the first solid electrolyte layer has a thickness of 100 nm or less, and
the second solid electrolyte layer has a thickness of 1 μm or more.

2. The electrolytic capacitor according to claim 1,
wherein at least a surface of the anode body has a porous portion,
the dielectric layer covers an outer surface of the porous portion and an inner wall surface of pores of the porous portion, the first solid electrolyte layer covers the inner wall surface of pores of the porous portion via the dielectric layer, and the second solid electrolyte layer covers the outer surface of the porous portion via the dielectric layer.

3. The electrolytic capacitor according to claim 1, wherein the second solid electrolyte layer has a thickness of 1 μm or more and 20 μm or less.

4. The electrolytic capacitor according to claim 1, wherein the second solid electrolyte layer has a thickness of 5 μm or more and 20 μm or less.

5. The electrolytic capacitor according to claim 1, wherein the first solid electrolyte layer has a thickness of 50 nm or more.

6. The electrolytic capacitor according to claim 1, wherein the first solid electrolyte layer has an electrical conductivity of 200 S/cm or less.

7. The electrolytic capacitor according to claim 1, wherein the first solid electrolyte layer has an electrical conductivity of 60 S/cm or more and 150 S/cm or less.

8. The electrolytic capacitor according to claim 1, wherein the second solid electrolyte layer has an electrical conductivity of 350 S/cm or more.

9. The electrolytic capacitor according to claim 1, wherein the second solid electrolyte layer has an electrical conductivity of 350 S/cm or more and 800 S/cm or less.

10. The electrolytic capacitor according to claim 1, wherein the first solid electrolyte layer contains the first conductive polymer of a non-self-doped type.

11. The electrolytic capacitor according to claim 1, wherein the second solid electrolyte layer contains the second conductive polymer of a non-self-doped type.

12. The electrolytic capacitor according to claim 1, wherein the first solid electrolyte layer has a lower electrical conductivity than the second solid electrolyte layer.

13. The electrolytic capacitor according to claim 5, wherein the first solid electrolyte layer has a lower electrical conductivity than the second solid electrolyte layer.

14. An electrolytic capacitor comprising:
an anode body;
a dielectric layer that covers the anode body;
a first solid electrolyte layer that covers the dielectric layer; and
a second solid electrolyte layer that covers the first solid electrolyte layer,
wherein the first solid electrolyte layer contains a first conductive polymer that includes polypyrrole as a basic skeleton, the second solid electrolyte layer contains a second conductive polymer that includes polythiophene as a basic skeleton, wherein the first solid electrolyte layer has a lower electrical conductivity than the second solid electrolyte layer, and the second solid electrolyte layer has a thickness of 1 μm or more.

15. A method for producing an electrolytic capacitor, comprising:
a first step of preparing an anode body provided with a dielectric layer;
a second step of forming a first solid electrolyte layer containing a first conductive polymer that includes polypyrrole as a basic skeleton by electrolytically polymerizing, on the dielectric layer, a precursor of the first conductive polymer; and
a third step of forming a second solid electrolyte layer containing a second conductive polymer that includes polythiophene as a basic skeleton by applying, to the first solid electrolyte layer, a processing liquid containing the second conductive polymer,
wherein the first solid electrolyte layer has a thickness of 100 nm or less, and
the second solid electrolyte layer has a thickness of 1 μm or more.

16. The method for producing an electrolytic capacitor according to claim 15, wherein the first solid electrolyte layer contains the first conductive polymer of a non-self-doped type.

17. The method for producing an electrolytic capacitor according to claim 15, wherein the second solid electrolyte layer contains the second conductive polymer of a non-self-doped type.

18. The method for producing an electrolytic capacitor according to claim 15, wherein the first solid electrolyte layer has a thickness of 50 nm or more.

19. The method for producing an electrolytic capacitor according to claim 15, wherein the first solid electrolyte layer has a lower electrical conductivity than the second solid electrolyte layer.

20. The method for producing an electrolytic capacitor according to claim 18, wherein the first solid electrolyte layer has a lower electrical conductivity than the second solid electrolyte layer.

* * * * *